United States Patent [19]  
Dhein et al.

[11] 4,171,294  
[45] Oct. 16, 1979

[54] STOVING LACQUERS CONTAINING REACTIVE DILUENTS

[75] Inventors: Rolf Dhein; Peter Höhlein; Rolf Küchenmeister; Wolfgang Beer, all of Krefeld, Fed. Rep. of Germany

[73] Assignee: Bayer Aktiengesellschaft, Fed. Rep. of Germany

[21] Appl. No.: 886,813

[22] Filed: Mar. 15, 1978

[30] Foreign Application Priority Data

Mar. 19, 1977 [DE] Fed. Rep. of Germany ....... 2712229

[51] Int. Cl.$^2$ .................. C08L 91/00; C09D 3/52; C09D 3/66
[52] U.S. Cl. .................. 260/22 CQ; 260/21; 260/31.6; 260/33.4 R; 260/33.6 R; 525/425; 525/428
[58] Field of Search .................. 260/21, 22 CQ, 850, 260/31.6, 33.4 R, 33.6 R

[56] References Cited

U.S. PATENT DOCUMENTS

| 3,380,942 | 4/1968 | Menke | 260/22 T |
| 3,434,987 | 3/1969 | Dhein et al. | 260/21 |
| 3,474,060 | 10/1969 | Dhein et al. | 260/21 |
| 3,928,265 | 12/1975 | Dhein et al. | 260/850 |
| 4,022,726 | 5/1977 | Zadrocki et al. | 260/21 |
| 4,031,047 | 6/1977 | Dhein et al. | 260/21 |
| 4,031,052 | 6/1977 | Dhein et al. | 260/22 T |
| 4,048,252 | 9/1977 | Behmel | 260/21 |
| 4,069,183 | 1/1978 | Daimer | 260/29.4 R |

FOREIGN PATENT DOCUMENTS 411217 7/1945 Italy ........................ 260/22 A

Primary Examiner—Ronald W. Griffin  
Attorney, Agent, or Firm—Connolly and Hutz

[57] ABSTRACT

An alkyd resin stoving lacquer with decreased loss of reactive diluent yields outstandingly hard coatings if a reactive diluent mixture comprising a lactam and a hydroxyl compound is used.

8 Claims, No Drawings

STOVING LACQUERS CONTAINING REACTIVE DILUENTS

The present invention relates to stoving lacquers based on alkyd resins or oil-free polyesters and aminoplasts, containing two different reactive diluents.

A "reactive diluent" is understood as a low-viscosity compound which, by diluting the lacquer binding agent, imparts to the lacquer the viscosity necessary for its application, and during the curing process predominantly do not, as might be expected, evaporate but become a constituent of the hardened lacquer film.

Lacquer systems which contain reactive diluents are known. Compounds with at least two hydroxyl groups and a molecular weight between about 66 and about 1,000 are recommended as reactive diluents for alkyd resins or oil-free polyesters in DT-OS (German Published Specification) No. 2,253,300. DT-OS (German Published Specification) No. 2,433,489 relates to the use of ε-caprolactones and DT-OS (German Published Specification) Nos. 2,439,548 and 2,505,246 relate to the use of ε-caprolactam, for the same purpose.

There are two basic difficulties in using lacquers containing reactive diluents: firstly, very hard coatings have not yet hitherto been successsfully prepared using alkyd resins or oil-free polyesters with a relatively low molecular weight; and secondly, it is not possible to avoid loss of the reactive diluents, in particular in the case of non-aqueous systems, during stoving.

It has now been found, surprisingly, that the difficulties mentioned can be avoided when a mixture of a lactam and a hydroxy compound is employed as the reactive diluent.

The invention thus relates to stoving lacquers consisting of (A) 40–94, preferably 50 to 80, % by weight of alkyd resins containing carboxyl and hydroxyl groups (with an oil content of up to 40% by weight) or oil-free polyesters, with an acid number of 1 to 100 and average molecular weights between 400 and 10,000, it being possible for the OH number to be between 30 and 400, (B) 5–40, preferably 10 to 30, % by weight of an aminoplast resin, (C) 1–20% by weight of reactive diluent, (D) 0–35% by weight of organic solvents and (E) optionally pigments and/or further auxiliaries and additives, characterised in that a mixture of I. a lactam and II. a hydroxy compound with at least two hydroxyl groups per molecule is employed as the reactive diluent and the molar ratio lactam/hydroxy compound should be n:1 and n can assume values from 1/20 to 10, preferably 1/5 to 5.

The percentage data relate to the sum of components A, B and C.

Hereinafter, "polyesters" are understood as polyesters which are free from fatty acids and oils, and "alkyd resins" are understood as polyesters which are modified by fatty acids or oils.

Alkyd resins and polyesters are understood as polycondensates prepared from alcohols and carboxylic acids by polycondensation according to known processes, of the type, for example, such as are defined in Römpp's Chemielexikon (Römpp's Chemical Dictionary), volume 1, page 202, Frankh'sche Verlagsbuchhandlung, Stuttgart, 1966, or are described by D. H. Solomon, The Chemistry of Organic Filmformers, page 75–101, John Wiley & Sons, Inc., New York, 1967.

Alcohols which are suitable for the synthesis of the alkyd resins and polyesters are aliphatic, cycloaliphatic and/or aromatic alcohols with 1–6, preferably 1–4, OH groups, bonded to non-aromatic C atoms, and 1–24 C atoms per molecule, for example glycols, such as ethylene glycol, propylene glycol, butanediols, neopentylglycol, 2-ethylpropane-1,3-diol and hexanediols; etheralcohols, such as diethylene glycols and triethylene glycols and oxyethylated bisphenols; perhydrogenated bisphenols, and furthermore trimethylolethane, trimethylolpropane, glycerol, pentaerythritol, dipentaerythritol, mannitol and sorbitol, and monohydric, chain-stopping alcohols, such as propanol, butanol, cyclohexanol and benzyl alcohol.

Suitable acid components for the synthesis of the alkyd resins and polyesters are aliphatic, cycloaliphatic saturated or unsaturated and/or aromatic polybasic carboxylic acids, preferably dicarboxylic, tricarboxylic and tetracarboxylic acids, with 4–12 C atoms per molecule or their derivatives which are capable of esterification (for example anhydrides or esters), for example phthalic anhydride, isophthalic acid, terephthalic acid, tetrahydrophthalic anhydride and hexahydrophthalic anhydride, trimellitic anhydride, pyromellitic anhydride, maleic anhydride, adipic acid and succinic anhydride, and furthermore halogenated acids, such as chlorophthalic acids and het-acid.

Suitable monocarboxylic acids for the preparation of the polyesters and alkyd resins are aliphatic, cycloaliphatic saturated and unsaturated and/or aromatic monocarboxylic acids with 6–24 C atoms per molecule, such as benzoic acid, butylbenzoic acid, toluic acid, hexahydrobenzoic acid, abietic acid and lactic acid, as well as fatty acids and fatty acid esters, such as linseed oil, soya bean oil, wood oil, safflower oil, castor oil, dehydrated castor oil, cottonseed oil, groundnut oil, tall oil fatty acid, linseed oil fatty acid, soya bean oil fatty acid, wood oil fatty acid, safflower oil fatty acid and dehydrated castor oil fatty acid, and products obtained from natural, unsaturated oils or fatty acids by conjugation or isomerisation; examples of suitable saturated fatty acids are coconut oil acids and α-ethylhexanoic acid.

The molecular weight, determined as the number-average, of the polyesters and alkyd resins is 400–10,000 (determined by vapour pressure osmometry in dioxane and acetone for molecular weights of up to 5,000, the lower value being regarded as correct in the case of differing values; determined by membrane osmometry in acetone for molecular weights above 5,000).

The polyesters and alkyd resins can be prepared in a manner which is in itself known by condensation by the customary processes.

In general, in this reaction the mixtures of raw materials are reacted at temperatures from 140°–250° C. in an inert gas atmosphere, for example $N_2$, with the splitting off of water, until the desired acid number is achieved.

Melamine/formaldehyde condensation products or urea/formaldehyde condensation products, for example, are to be regarded as the aminoplast resins. Melamine resins are all the conventional melamine/formaldehyde condensates which are not etherified or are etherfied with saturated mono-alcohols with 1 to 4 C atoms, such as are described, for example, in French Pat. No. 943,411, or by D. H. Solomon, The Chemistry of Organic Filmformers, 235–240, John Wiley & Sons, Inc., New York, 1967. However, the melamine resins can also be completely or partially replaced by other crosslinking aminoplasts, such as are described, for example, in "Methoden der Organischen Chemie"

("Methods of Organic Chemistry") (Houben-Weyl), volume 14/2, part 2, 4th edition, Georg Thieme Verlag, Stuttgart 1963, 319 et. seq.

All the alcohols which are known as starting components for the polyesters and the preparation of the alkyd resin (see above) are suitable as the hydroxy compound component of the reactive diluent. For the purpose of crosslinking reactions and thus for improving the surface hardness, it is often advisable to use hydroxy compounds with at least three hydroxyl groups. This is always particularly advantageous when relatively low-molecular alkyd resins or polyesters are employed.

Compounds of the formula

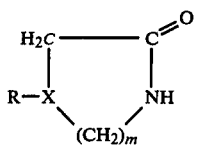

wherein

X denotes nitrogen or CH,

R denotes hydrogen, an aliphatic radical with 1 to 30 C atoms, an araliphatic radical with 3 to 12 C atoms or a pyridine radical which is optionally substituted by $C_1$-$C_4$-alkyl radicals and m denotes an integer from 1 to 9, are suitable as the lactam component of the reactive diluent.

Preferred lactams are 1-N-methylhexahydro-1,4-diazepin-3-one, ω-dodecyllactam, γ-butyrolactam, δ-valerolactam and, in particular, ε-caprolactam.

According to a preferred variant, the lactam component and hydroxyl component of the reactive diluent are dissolved or melted at temperatures of 40°–150° C. and stirred at this temperature for about 1 hour. In most cases, low-viscosity, water-clear liquids result which contain both components in the form of an "adduct".

Suitable organic solvents for the stoving lacquers according to the invention are the customary lacquer solvents, such as, for example, alcohols with 1 to 4 C atoms, such as methanol, ethanol, n- and iso-propanol and butanols; acetic acid esters with 2 to 4 C atoms in the alcohol component, such as ethyl acetate and butyl acetate or ethylglycol acetate; ethylene glycol monoalkyl ethers with 1 to 4 C atoms in the alkyl radical, such as ethylene glycol monomethyl ether, monoethyl ether and monobutyl ether; aliphatic and alicyclic ketones, such as methyl ethyl ketone, methyl isobutyl ketone, cyclohexanone and acetone; lower ethers, such as tetrahydrofurane; chlorinated hydrocarbons, such as trichloroethylene; and aromatic hydrocarbons, such as benzene, toluene and xylene, or mixtures of the solvents mentioned.

The coating agents according to the invention can contain customary auxiliaries and additives, for example pigments, flow control agents or fillers.

The stoving lacquers according to the invention can be applied by the customary processes, such as spraying, dipping, pouring or brushing or by the "coil-coat" process, to the objects to be coated and are stoved at temperatures of about 80° to about 260° C. They lead to coatings which are far harder than those obtainable with stoving lacquers containing only one reactive diluent.

In the examples which follow, the parts and percentages given are parts by weight and percentages by weight.

EXAMPLE 1

A mixture of 60 parts of a polyester, prepared from 677 g (2 mols) of phthalic anhydride, 668 g (2 mols) of adipic acid and 1,903 g (8 mols) of 2-ethylpropane-1,3-diol, with an acid number of 8, 10 parts of an adduct of ε-caprolactam/trimethylolpropane (molar ratio 1:1), 30 parts of hexamethoxymelamine (Cymel 301; commercial product from Messrs. American Cyanamid) and 60 parts of titanium dioxide is adjusted with ethylglycol acetate, to a use viscosity corresponding to a flow time (DIN 53,211, 4 mm cup) of 26 seconds and, after being applied to a test metal sheet (wet film thickness=150μ), is stoved at 150° C. for 30 minutes.

A hard and elastic lacquer film results.

Stoving residue (150° C./1 hour): 73.8% at a viscosity corresponding to a flow time of 32 seconds.

EXAMPLE 2

A mixture of 635 g of adipic acid, 1,692 g of benzoic acid and 1,166 g of trimethylolpropane is esterified at 200° C. until the acid numer reaches 10. 5 parts of an adduct of ε-caprolactam/trimethylolpropane (molar ratio 1:1), 20 parts of hexamethoxymelamine (Cymel 301) and 60 parts of titanium dioxide are added to 60 parts of this polyester. The white lacquer prepared on the triple roll mill is adjusted, with ethylglycol acetate, to a use viscosity corresponding to a flow time (DIN 53,211, 4 mm cup) of 28 seconds and, after being applied to a test metal sheet, is stoved as above to give a hard and elastic lacquer film. Stoving residue (150° C./1 hour): 70.6% at a viscosity corresponding to a flow time of 28 seconds.

What we claim is:

1. A stoving lacquer comprising
   (A) from 40 to 94% by weight of
      (a) an alkyd resin containing carboxyl groups and hydroxyl groups with an oil content of up to 40% by weight or
      (b) an oil free polyester with an acid number of 1 to 100, an hydroxyl number of 30 to 400 and an average molecular weight between 400 and 10,000
   (B) 5 to 40% by weight of an aminoplast resin
   (C) 1 to 20% by weight of a reactive diluent which is a low viscosity water clear adduct obtained by dissolving or melting a lactam component and an hydroxy component at a temperature of 40° to 150° C. followed by agitation at said temperature for about 1 hour, said lactam component being of the formula

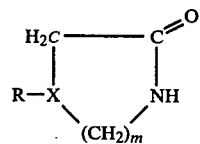

wherein X is nitrogen or CH, R is hydrogen, an aliphatic radical having 1 to 30 carbon atoms, an araliphatic radical having 3 to 12 carbon atoms, a pyridine radical, or a pyridine radical substituted by one or more $C_1$-$C_4$ alkyl radicals and m is an integer from 1 to 9 and said hydroxy compound being a 1 to 24 carbon atom aliphatic, cycloaliphatic and/or aromatic alcohol with 2 to 6 hydroxyl groups bonded to non-aromatic carbon atoms, said lactam component and said hydroxyl component having a molar ratio of n:1 wherein n is a value of from 1/20 to 10 and (D) 0 to 35% by weight of an organic solvent, the aforesaid percentages by weight being based on the sum of components (A), (B) and (C).

2. A stoving lacquer according to claim 1, in which 50 to 80% by weight of component A is present.

3. A stoving lacquer according to claim 1, in which 10 to 30% by weight of component B is present.

4. A stoving lacquer according to claim 1, in which a pigment or pigments and/or further auxiliaries and additives are present.

5. A stoving lacquer according to claim 1, in which n has a value from 1/5 to 5.

6. A stoving lacquer according to claim 1, in which the hydroxy compound has at least three hydroxyl groups per molecule.

7. A stoving lacquer according to claim 1, in which the lactam component is 1-N-methylhexahydro-1,4-diazepin-3-one, ω-dodecyllactam, γ-butyrolactam, δ-valerolactam or ε-caprolactam.

8. A stoving lacquer according to claim 1 wherein the hydroxyl component of said reactive diluent is selected from the group consisting of glycols, ether alcohols, perhydrogenated bisphenols, trimethylolethane, trimethylolpropane, glycerol, pentaerythritol, dipentaerythritol, mannitol and sorbitol.

* * * * *